July 11, 1933.  E. O. BOQUIST ET AL  1,918,177
STEREOOCULATOR
Filed Dec. 16, 1931  4 Sheets-Sheet 1
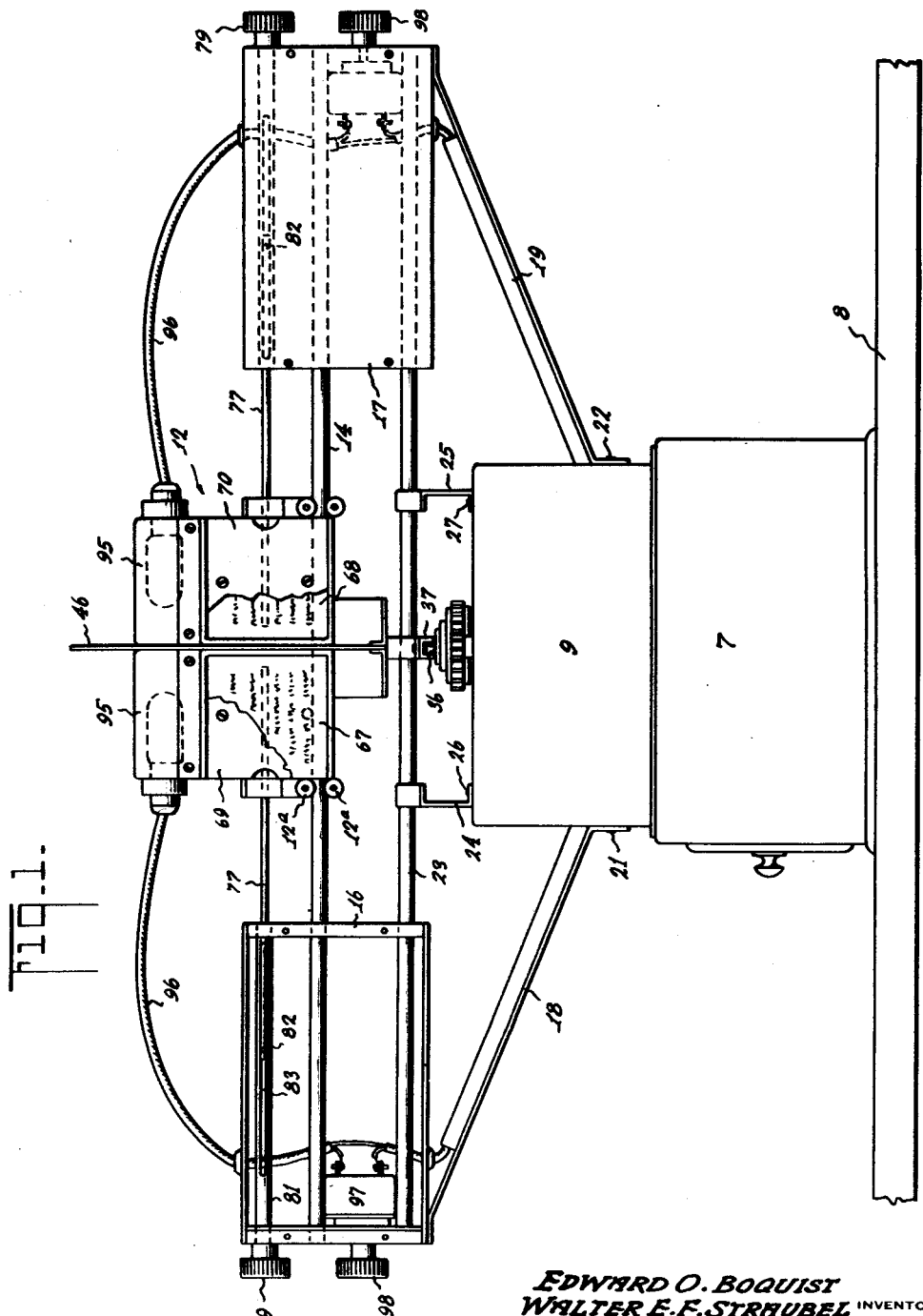

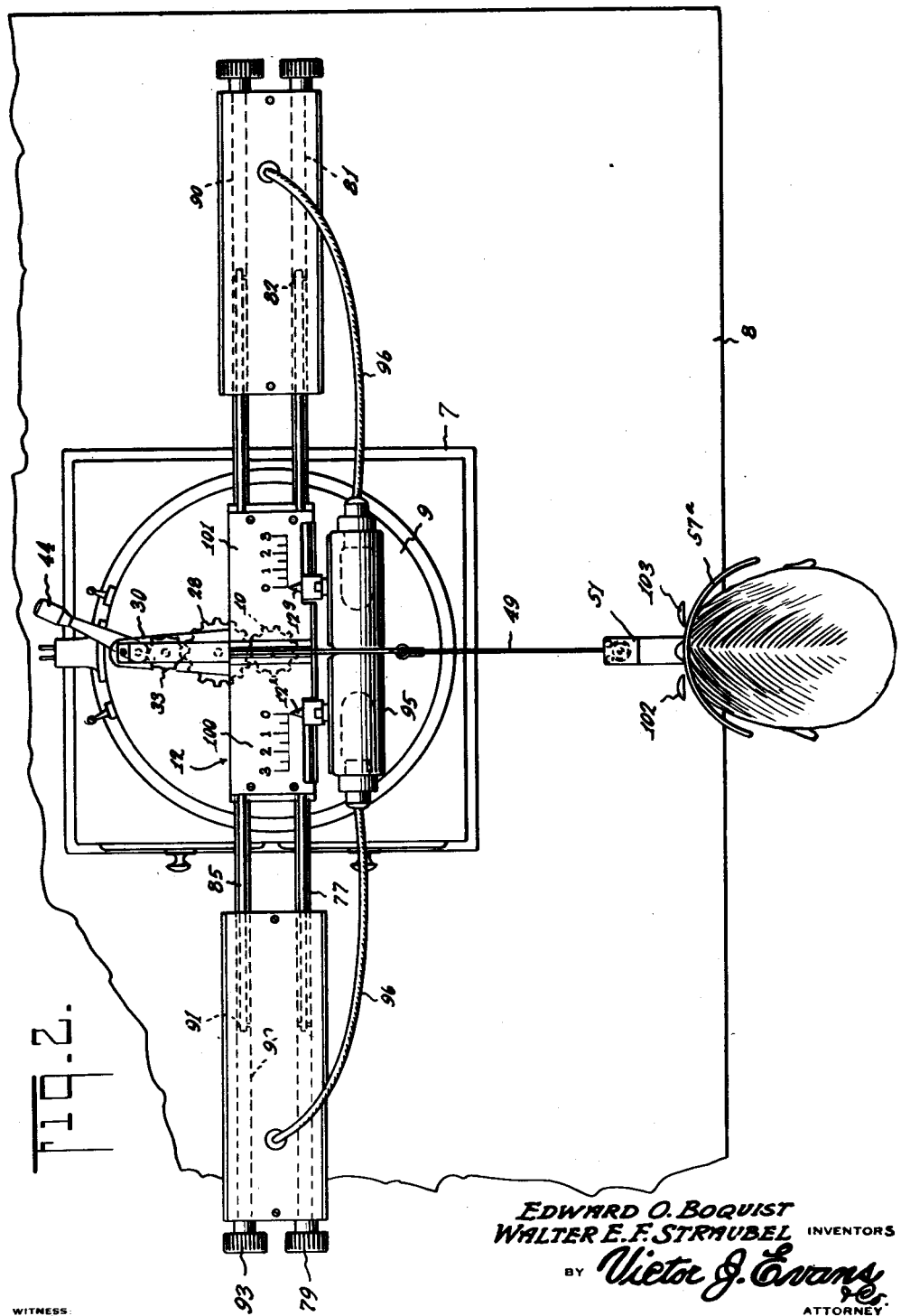

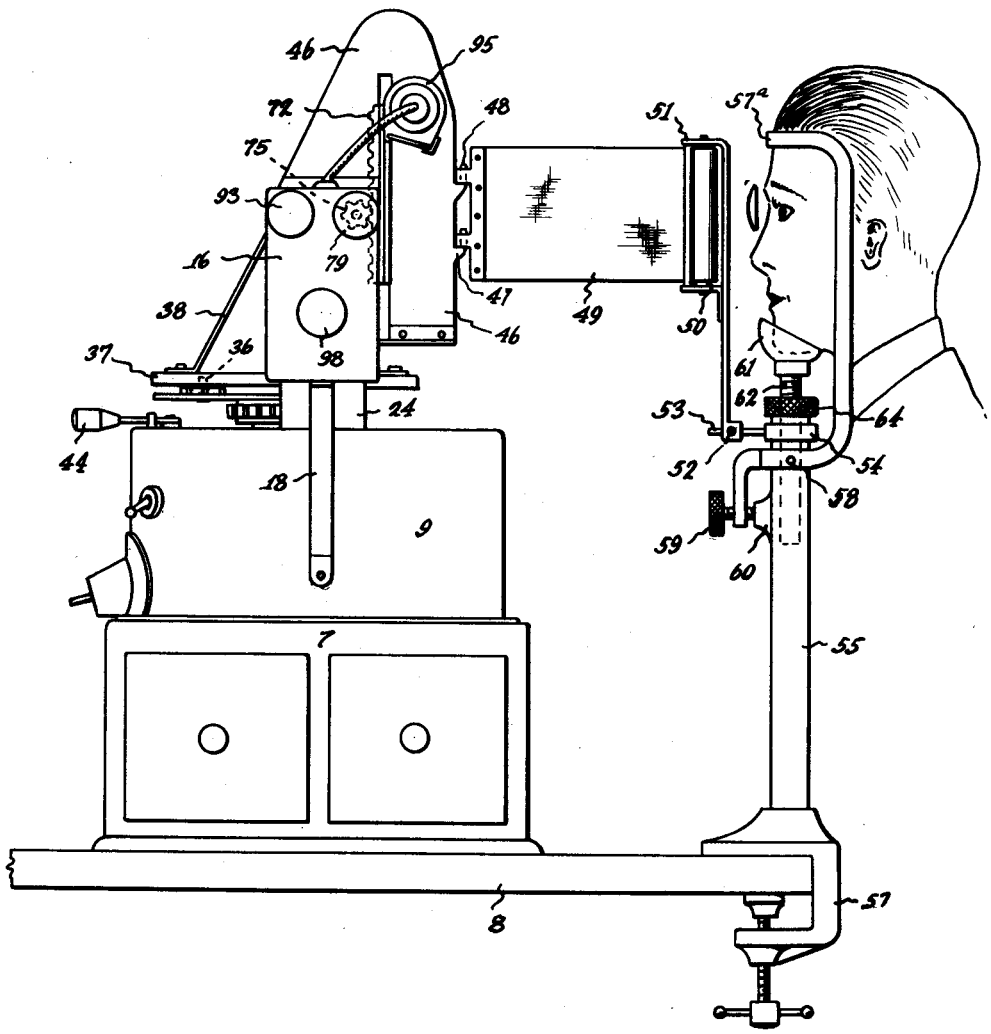

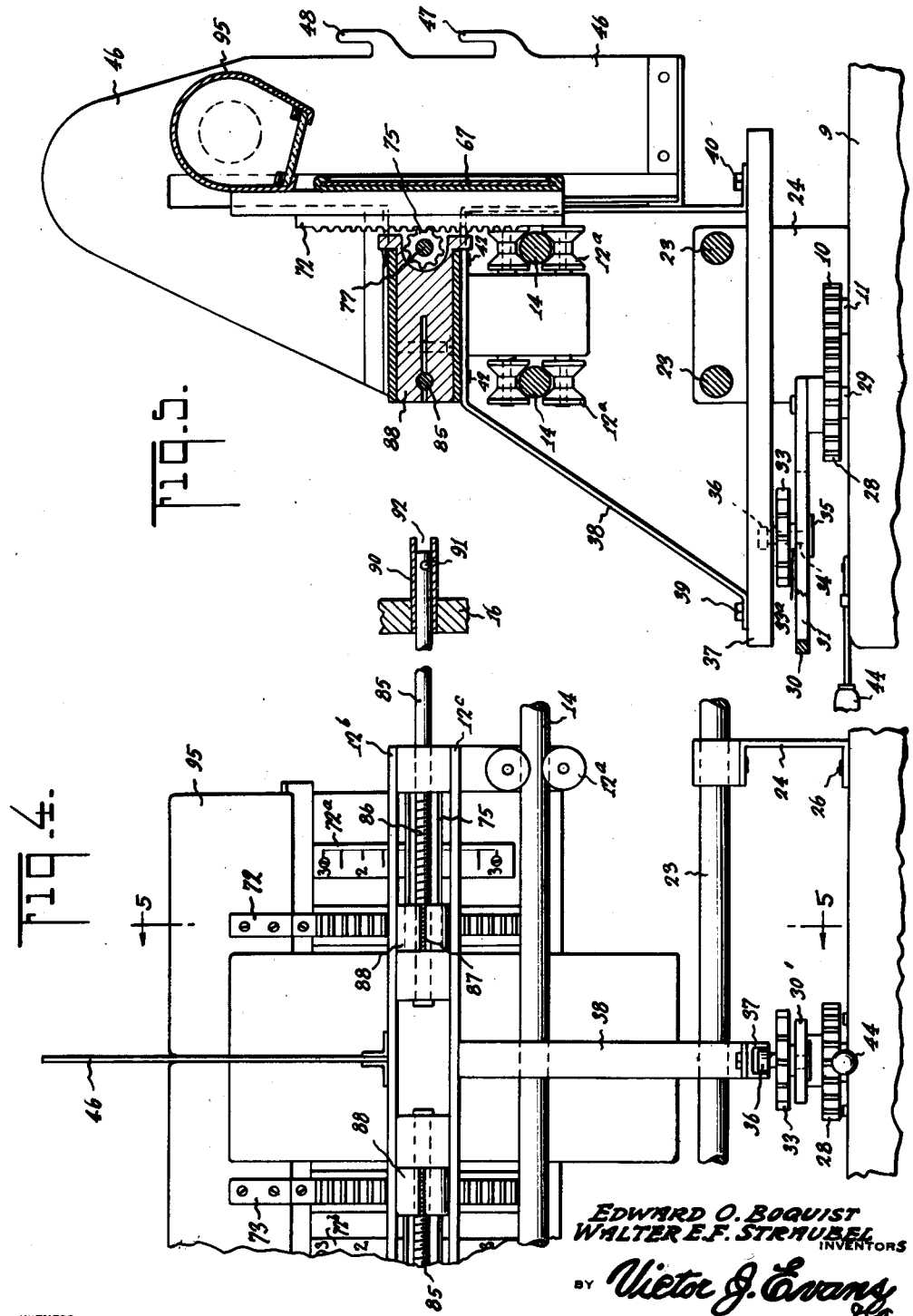

Patented July 11, 1933

1,918,177

UNITED STATES PATENT OFFICE

EDWARD O. BOQUIST AND WALTER E. F. STRAUBEL, OF WEST NEW YORK, NEW JERSEY

STEREOOCULATOR

Application filed December 16, 1931. Serial No. 581,459.

This invention relates to an instrument which we call a stereo-oculator, the same being intended for the correction of heterotropia, vertical and horizontal, heterophoria, amblyopia-exanopsia, the cultivation and development of perspective, development and refinement of fusion, amplitude of fusion convergence and the elimination of suspenopsia, relaxation of accommodation, as well as testing and measuring duction and phoria, and for exercising all extrinsic and intrinsic muscles.

The invention will be fully and comprehensively understood from a consideration of the following detailed description when read in connection with the accompanying drawings which form part of the application with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

The instrument illustrated comprises a stereoscopic arrangement of treatment glasses, a removable septum which is attached to the carriage and a head and chin rest which keeps the head of the patient in a stationary position, and an electric driven universal motion machine composed of an electric motor, driving universally two movable object holders and chart frames on a movable carriage, the frames and holders being adjustable independently of each other in vertical and horizontal directions while in or not in motion. On the carriage we have an adjustment for short and long swings of the carriage and objects. The short and long swings and the off center movement of the carriage and object holders and chart frames are controlled for varying speeds.

In front of either eye will be located if necessary an adjustable occlusion disc, located toward either the inner or outer canthus of each eye as may be required.

The illumination of charts and objects is by means of electric bulbs situated in a reflector at the top of the chart frames and object holders. This illumination can be made bright or dim, each bulb acting independently of the other, controlled by a suitable resistance. The illumination of the charts and objects and the movement of the carriage are controlled by separate switches, each acting independently of the other.

In the drawings:

Fig. 1 is a front elevation of the instrument.

Fig. 2 is a plan view of the same showing a patient being treated by means of the instrument.

Fig. 3 is a side elevation of the instrument and shows a patient receiving treatment by the instrument.

Fig. 4 is a fragmentary rear elevational view; and

Fig. 5 is a vertical section taken approximately on the line 5—5 of Fig. 4, looking in the direction of the arrows.

Referring to the drawings for a more detailed description thereof, the numeral 7 indicates a card index cabinet on a base 8. The instrument is shown on the cabinet 7 and as having a hollow base 9 in which an electric motor is mounted, said motor being adapted to be operated on either alternating or direct current. A pinion 10 is mounted on the shaft 11 of the electric motor above the top of the base 9. Mechanism driven by the rotation of the pinion 10 is provided to effect horizontal motion of a carriage 12 on a pair of spaced parallel rails 14, said carriage being provided with four rollers 12a at each end which contact with the rails 14 as shown in Figs. 1 and 5, said rails being supported in spaced casings 16 and 17 which are supported respectively on brackets 18 and 19, secured to the base 9 at 21 and 22, respectively, said casings also being supported on a pair of spaced parallel bars 23 mounted on brackets 24 and 25, secured to the hollow base 9 at 26 and 27, respectively.

The pinion 10 is given a rotary movement by the mentioned electric motor. The rotation of the pinion 10 is communicated to the gear 28 which is mounted on a pin 29 secured to the top of the base 9. The pinion 29 carries with it an arm 30 provided with a longitudinal slot 31 in which is adjustably fixed a nut 33 resting on top of the arm 30. A threaded pin 34 having a head 35 contacting with the undersurface of the arm 30 passes through the slot 31 of the arm and threadedly through the nut and carries on its upper end a roller 36 positioned in an inverted channel 37 connected to and supported by a brace 38 at 39 and 40, said brace being secured to the carriage 12 as indicated by the numerals 42. The nut 33 has a collar 33a bearing on the top of the arm 30 so that when the nut is screwed down the pin 34 and the roller 36 carried thereon are fixed relative to the arm 30. The oscillation of the arm 30 is effective to cause rectilinear reciprocation of the carriage through the movement of the roller in the inverted channel 37, the same contacting with the sides of said channel. The amplitude of the swing of the carriage 12 may be adjusted by adjustment of the nut 33 in the slot 31 of the arm 30. The speed of travel of the carriage 12 is regulated by a lever 44 of speed regulating mechanism contained within the base 9, the construction of such speed regulating mechanism being well understood and therefore not necessary to be described herein.

The carriage 12 carries a vertical partition 46 formed with hooks 47 and 48 on the front edge thereof and in spaced vertical relation. A septum 49 is pivotally connected to the hooks 47 and 48 and extends forwardly of the partition 46. The forward end of the septum 49 is mounted on a spring roller 50, the ends of which are journalled in a frame 51 adjustably mounted by means of a screw 52 on a bar 53 which extends from and is connected to the collar 54 of the standard 55 which is releasably secured to the base 8 by means of a clamp 57. A frame 57a against which the forehead of a patient rests is mounted on the standard 55, being pivoted thereto by means of a pin 58 and held in position relative to the standard by means of a screw 59 threadedly engaging the lower end of the frame and pressing on a boss 60 integral with and extending from the standard 55. A chin rest 61 for the patient is relatively adjustable relative to the standard 55 by being mounted on a threaded bolt 62 which threadedly engages in the standard 55. A moving nut 64 disposed on the threaded bolt 62 functions to hold the chin rest in adjusted position. That end of the septum which is connected to the hooks 47 and 48 of the partition 46 is pivotally connected to said hooks so that the septum may swing with the carriage. The septum being mounted on the spring roller 50, it winds and unwinds automatically in accordance with the required length as determined by the position of the carriage, whereby the septum always remains taut.

The septum 49 divides the vision of the patient as between the two eyes so that each eye sees only one of the charts 67 and 68, the left eye seeing the former and the right eye the latter. The mentioned charts, which are vertically positioned, are removably secured on plates 69 and 70, respectively. Mechanism is provided for vertically adjusting the plates 69 and 70 separately, said mechanism comprising racks 72 and 73 mounted respectively on the back of plates 69 and 70. The racks 72 and 73 are each engaged by a pinion 75 which are mounted on the ends of horizontal shafts 77 turnable by grooved knobs 79. The shafts 77 are slidable inside of sleeves 81 on which the knobs 79 are mounted and carry pins 82 which extend through slots 83 in the sleeves 81 so that they may be turned by the turning of the knobs 79 which are mounted on the ends of the sleeves 81, said sleeves being mounted against longitudinal movement and so that the shafts 77 may slide relative to the mentioned sleeves in order to be effective to move vertically the chart-carrying plates 69 and 70 in whatever position the carriage 12 may be and also to allow movement of the carriage and the shafts 77 relative to the sleeves, which sleeves are journalled in the outer ends of the housings 16 and 17. Charts 72a and 72b are provided so that the level or vertical adjustment of the mentioned charts may be determined, it being sometimes necessary to have the charts at different levels, as when the eyes of a patient differ in certain respects. Means are provided for adjustably separating the mentioned chart-holding plates, said means comprising shafts 85 which are journalled in the ends of the housings 16 and 17 and which are threaded as indicated at 86 in Fig. 4 and which terminate in reduced threaded portions 87 which threadedly engage blocks 88 to which the chart-carrying plates are secured, the mentioned blocks 88 being slidable between plates 12b and 12c, which form part of the mentioned carriage. The shafts 85 are longitudinally slidable in sleeves 90 and carry pins 91 extending through slots 92 in the sleeves 90, the sleeves 90 carrying on their outer ends, outside of the housings 16 and 17, grooved knobs 93, the foregoing construction being provided for the purpose of separately adjusting the lateral positions of the card-holding plates and to allow the shafts 85 to move relative to the sleeves 90, which latter are mounted against lateral movement relative to the housings 16 and 17.

Scales 100 and 101, shown in Fig. 2, are provided on the carriage 12 so that the respective positions of the mentioned chart holders may be determined. Points 12e and 12g, which are movable with the charts and relative to the scales 100 and 101, respectively, are provided for reading on the scales the lateral positions or the separation of the charts. In using the device, the patient, as shown in Fig. 3, has his chin resting on the cup 61 with his forehead against the guide 57a and is preferably provided with suitable correcting lenses 102 and 103, preferably mounted in spectacle frames, the character of which lenses is understood by those skilled in the art. The mentioned charts are mostly similar in the matter printed thereon but differ in many slight respects. Before starting treatment, patient is asked to fuse the charts before the carriage is put in motion. With the patient sitting before the instrument, as shown in Fig. 3, his vision being divided by the mentioned septum, he views the two cards, each with one eye, the mentioned carriage being in horizontal reciprocating motion, with the eyes of the patient following the charts in their motion with the carriage, the amplitude of motion of the carriage being suited to the requirements of the patient or operator, the mentioned amplitude increasing as treatment progresses or in accordance with the strength of the patient's eye muscles, the vertical levels of the respective charts and the intensity of illumination of the same being suited to the patient, as well as the distance of the cards from each other, the separation of the charts being effected only when the condition of the patient's eyes is such that the differences of the charts are recognized by the patient, it being remembered, as above stated, that the charts are largely alike but have minor differences. The separation of the charts is increased as the treatment progresses or in other words as the patient's eyes improve.

Electric lamps are provided for illuminating the mentioned charts, there being one lamp for each chart, said lamps being within reflectors 95 mounted on the carriage 12 and disposed on opposite sides of the partition 46. The lamps are fed through cords 96 which lead to variable resistances 97 operable by means of knobs 98 so that the mentioned lamps may be separately varied as to the light intensity emitted therefrom, whereby the charts may be illuminated to the extent desired, it being sometimes desirable or necessary to illuminate one chart more than the other, as for example when the eyes of a patient are different in certain respects. The mentioned resistances are held in the housings 16 and 17.

What is claimed as new and useful is:

1. A stereo-oculator comprising a cabinet, horizontal bars disposed crosswise above the cabinet, casings located at the outer ends of the bars to lie laterally projected from opposite sides of the cabinet, rails above the bars, a carriage movable on the rails between the casings, card holders on the carriage, a partition between the holders and fixed to the carriage, means accessible at the outer ends of the casings to permit vertical adjustment of the holders independently of each other, and power means in the cabinet and operated with the carriage to oscillate the same upon the rails.

2. A stereo-oculator comprising a cabinet, horizontal bars disposed crosswise above the cabinet, casings located at the outer ends of the bars to lie laterally projected from opposite sides of the cabinet, rails above the bars, a carriage movable on the rails between the casings, card holders on the carriage, a partition between the holders and fixed to the carriage, means accessible at the outer ends of the casings to permit vertical adjustment of the holders independently of each other, power means in the cabinet and operated with the carriage to oscillate the same upon the rails, and means on the partition for the detachable connection of a septum thereto.

3. A stereo-oculator comprising a cabinet, horizontal bars disposed crosswise above the cabinet, casings located at the outer ends of the bars to lie laterally projected from opposite sides of the cabinet, rails above the bars, a carriage movable on the rails between the casings, card holders on the carriage, a partition between the holders and fixed to the carriage, means accessible at the outer ends of the casings to permit vertical adjustment of the holders independently of each other, power means in the cabinet and operated with the carriage to oscillate the same upon the rails, means on the partition for the detachable connection of a septum thereto, and telescopically interfitted connections included in the first named means.

4. A stereo-oculator comprising a cabinet, horizontal bars disposed crosswise above the cabinet, casings located at the outer ends of the bars to lie laterally projected from opposite sides of the cabinet, rails above the bars, a carriage movable on the rails between the casings, card holders on the carriage, a partition between the holders and fixed to the carriage, means accessible at the outer ends of the casings to permit vertical adjustment of the holders independently of each other, power means in the cabinet and operated with the carriage to oscillate the same upon the rails, means on the partition for the detachable connection of a septum thereto, telescopically interfitted connections included in the first named means, and variable intensity illuminators carried by the holders at opposite sides of the partition and having reflectors for projecting light upon charts in the holders.

5. A stereo-oculator comprising a cabinet, horizontal bars disposed crosswise above the cabinet, casings located at the outer ends of the bars to lie laterally projected from opposite sides of the cabinet, rails above the bars, a carriage movable on the rails between the casings, card holders on the carriage, a partition between the holders and fixed to the carriage, means accessible at the outer ends of the casings to permit vertical adjustment of the holders independently of each other, power means in the cabinet and operated with the carriage to oscillate the same upon the rails, means on the partition for the detachable connection of a septum thereto, telescopically interfitted connections included in the first named means, variable intensity illuminators carried by the holders at opposite sides of the partition and having reflectors for projecting light upon charts in the holders, and means within the casings and manually operable to vary the intensity of said illuminators.

6. A stereo-oculator comprising a cabinet, horizontal bars disposed crosswise above the cabinet, casings located at the outer ends of the bars to lie laterally projected from opposite sides of the cabinet, rails above the bars, a carriage movable on the rails between the casings, card holders on the carriage, a partition between the holders and fixed to the carriage, means accessible at the outer ends of the casings to permit vertical adjustment of the holders independently of each other, power means in the cabinet and operated with the carriage to oscillate the same upon the rails, means on the partition for the detachable connection of a septum thereto, telescopically interfitted connections included in the first named means, variable intensity illuminators carried by the holders at opposite sides of the partitions and having reflectors for projecting light upon charts in the holders, means within the casings and manually operable to vary the intensity of said illuminators, and means to regulate the oscillatory movement of the carriage upon the rails.

In testimony whereof we hereby affix our signatures.

EDWARD O. BOQUIST.
   WALTER E. F. STRAUBEL.